O. H. & A. F. PIEPER.
LUBRICATING BEARING.
APPLICATION FILED NOV. 12, 1917.

1,272,518.

Patented July 16, 1918.

WITNESSES:
Walter B. Payne
George W. Powell

INVENTORS
Oscar H. Pieper
Alphonse F. Pieper
BY
their ATTORNEYS.

UNITED STATES PATENT OFFICE.

OSCAR H. PIEPER AND ALPHONSE F. PIEPER, OF ROCHESTER, NEW YORK.

LUBRICATING-BEARING.

1,272,518.     Specification of Letters Patent.     Patented July 16, 1918.

Original application filed May 27, 1912, Serial No. 699,938. Divided and this application filed November 12, 1917. Serial No. 201,545.

*To all whom it may concern:*

Be it known that we, OSCAR H. PIEPER and ALPHONSE F. PIEPER, both of Rochester, in the county of Monroe and State of New York, have invented certain new and useful Improvements in Lubricating-Bearings; and we do hereby declare the following to be a full, clear, and exact description of the same, reference being had to the accompanying drawings, forming a part of this specification, and to the reference-numerals marked thereon.

The general object of this invention is to provide adequate and continuous lubrication for a vertically arranged shaft, and specifically the structure is intended for maintaining in a lubricated state a motor shaft disposed in a vertical position, as for instance in the usual driving relation of certain types of dental engines. A further purpose of the improvement is to afford a bearing requiring very little attention, at the same time insuring constant proper lubrication of the rotating element. Still an additional object that is contemplated is to provide a reasonably economical arrangement which can be manufactured and sold under conditions that make it entirely commercial. To these and other ends the invention consists in certain improvements and combinations of parts, all as will be hereinafter more fully described, the novel features being pointed out in the claims at the end of the specification.

In the drawings.

Similar reference numerals in the several figures indicate the same part.

Figure 1:
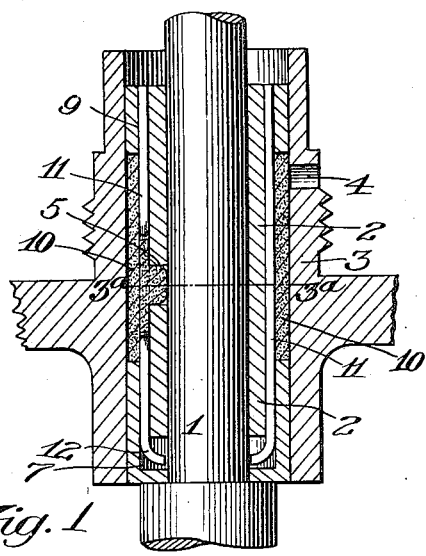
Figure 1 is a vertical sectional view of a bearing made in accordance with a preferred arrangement of the invention.
Figure 2:
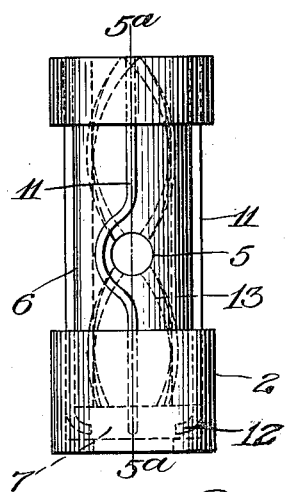
Fig. 2 is a side elevation of the bearing sleeve.
Figure 3:
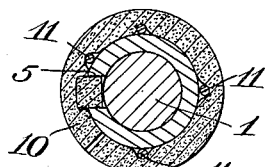
Fig. 3 is a transverse sectional view on the line 3ª—3ª of Fig. 1, with the outer support removed.
Figure 4:
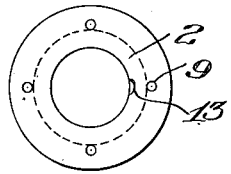
Fig. 4 is a bottom plan view of the bearing sleeve.
Figure 5:
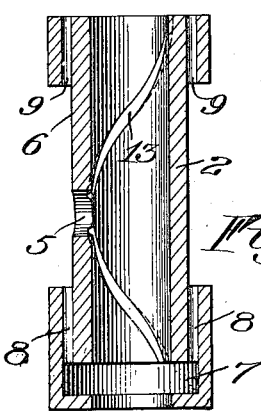
Fig. 5 is a vertical sectional view of the sleeve on the line 5ª—5ª of Fig. 2.

This application is a division of an original application filed by us May 27, 1912, Serial No. 699,938. There are various possible ways in which the essential features of the improvement may be carried out practically, and the present embodiment is intended as an example, without limiting the invention to the details illustrated. In this preferred form of the improvement, 1 designates a spindle or shaft which is vertically arranged, and comprises for instance the armature shaft of an electric motor. The shaft 1 turns within a bearing sleeve designated generally by 2 and fixed within the stationary hollow support or frame 3, which may form a part of the motor casing or housing, and is provided with an opening 4 through which lubricant can be supplied to the bearing, as required. The invention may be said to consist generally in supplying a lubricant to the shaft at the center of the bearing, from which it feeds automatically to the ends, and thence returns to the central portion of the bearing sleeve, whereby a circulation is maintained and the shaft automatically lubricated at every part of the bearing.

The bearing sleeve 2 is provided with a transverse opening 5, which communicates with the spindle 1, preferably at the central portion of the bearing, and terminates at its outer edge in an enlarged annular exterior recess 6, which extends for a considerable distance on opposite sides of the opening 5. The bearing sleeve 2 is provided near its lower end with a pocket 7, and 8 designate longitudinal openings leading from the annular recess 6 to the pocket 7. Openings 9 are also provided at the upper end of the sleeve, leading therefrom to the upper end of the recess 6. The bearing sleeve 2 is provided on its interior surface with grooves 13, preferably of helical formation, and communicating at one end with the central opening 5 from which they lead to both ends of the bearings.

The transverse opening 5 and the space afforded by the annular recess 6 are filled with an absorbent packing such as felt designated by 10. Arranged under the felt are strands or wicks 11 of suitable fibrous material which extend through the longitudinal openings 8 and 9, from the central part of the bearing to the ends thereof, the lower ends 12 projecting freely into the pocket 7.

In the practical operation of the bearing, the lubricant which is initially supplied to the absorbent material 10 reaches the spindle by being sucked through the opening 5 and is carried thence to the opposite ends of the bearing through the grooves 13, whereby the shaft is continuously lubricated at every point between the ends of the bearing sleeve. The lubricant reaching the upper end of the sleeve is carried by gravity through the strands or wicks 11 back to the central recess 6 and the lubricating fluid which reaches the lower end of the bearing sleeve enters the pocket 7 into contact with the free ends 12 of the wicks, which serve to conduct the lubricant by capillary attraction upwardly, to the central portion of the bearing, whence it is again fed to the shaft through the central opening 5. This action continues in the manner described, and additional lubricant can be furnished to the absorbent body 10 through the opening 4. The absorbent body 10, when once saturated, will hold a sufficient supply of lubricant for a long period, and no further attention to the bearing is required.

We claim as our invention:

1. The combination with a rotatable shaft, of a bearing sleeve surrounding it and having a transverse opening communicating with the shaft and terminating at its outer end in an enlarged annular recess formed in the exterior of the sleeve, the sleeve having openings extending longitudinally from its ends to said recess, absorbent material located in said recess and extending through the aforementioned transverse opening into contact with the shaft, and absorbent strands extending through the longitudinal openings into contact with said absorbent material in the recess.

2. The combination with a rotatable shaft, of a bearing sleeve surrounding it having a transverse opening extending therethrough, a plurality of longitudinal openings extending from its ends to said transverse opening, absorbent material located in the transverse opening, and absorbent strands arranged in said longitudinal openings.

3. The combination with a rotatable shaft, of a bearing sleeve surrounding it having a transverse opening extending therethrough and communicating with a plurality of helical grooves on the interior of the sleeve which extend to its ends, the sleeve also having longitudinal openings extending from its ends to the transverse opening, and absorbent strands arranged in said longitudinal openings.

4. The combination with a vertically rotatable shaft, of a hollow support, a bearing sleeve fixed in the support and surrounding said shaft, the sleeve having an annular exterior recess communicating with the shaft by a transverse opening, and openings leading from the recess longitudinally of the sleeve and communicating with a pocket formed at the lower end of the sleeve adjacent to the shaft, absorbent material located in said recess, and strands of absorbent material arranged in the longitudinal openings.

5. The combination with a rotatable shaft, of a hollow support, a bearing sleeve fixed in the support and surrounding said shaft and provided with grooves adjacent the shaft and leading to the ends of the sleeve, the sleeve having an annular exterior recess communicating with the shaft by a transverse opening and longitudinal openings leading from said recess to the ends of the sleeve, absorbent material located in said recess, and strands of absorbent material arranged in the longitudial openings.

6. The combination with a vertically rotatable shaft, of a hollow support, a bearing sleeve fixed in the support and surrounding said shaft and provided with a plurality of helically arranged grooves adjacent to the shaft and leading to the ends of the sleeve, the sleeve having an annular exterior recess communicating with the shaft by a transverse opening and an annular interior pocket adjacent to the shaft at the lower end of the sleeve, the sleeve also having longitudinal openings leading from the recess to said pocket, absorbent material located in said recess and transverse openings, and absorbent strands disposed in the longitudinal openings.

7. The combination with a rotatable shaft, of a hollow support, a bearing sleeve fixed in the support and surrounding said shaft and provided with a plurality of helically arranged grooves adjacent to the shaft and leading to opposite ends of the sleeve, the sleeve having a central annular exterior recess communicating with the shaft by a transverse opening and longitudinal openings communicating with the shaft at the ends of the sleeve, and absorbent material disposed in said central recess and longitudinal openings.

OSCAR H. PIEPER.
ALPHONSE F. PIEPER.